United States Patent

Calmettes et al.

[11] Patent Number: 5,216,783
[45] Date of Patent: Jun. 8, 1993

[54] BAND CLAMP

[75] Inventors: Lionel Calmettes; Michel Andre, both of Romorantin Lanthenay, France

[73] Assignee: Etablissements Caillau, France

[21] Appl. No.: 901,809

[22] Filed: Jun. 22, 1992

Related U.S. Application Data

[63] Continuation-in-part of Ser. No. 695,280, May 3, 1991.

[30] Foreign Application Priority Data

May 23, 1990 [FR] France .................................. 90 06476

[51] Int. Cl.$^5$ .............................................. B65D 63/00
[52] U.S. Cl. .................................. 24/20 R; 24/20 CW
[58] Field of Search ................ 24/20 R, 20 EE, 20 S, 24/20 CW, 20 TT, 20 W, 23 R, 23 EE

[56] References Cited

U.S. PATENT DOCUMENTS

| | | | |
|---|---|---|---|
| 4,305,179 | 12/1981 | Sakurada | 24/20 R |
| 4,380,096 | 4/1983 | Nishida et al. | 24/20 R |
| 4,402,113 | 9/1983 | Smith | 24/20 R |

Primary Examiner—Victor N. Sakran
Attorney, Agent, or Firm—Marshall & Melhorn

[57] ABSTRACT

This invention relates to a clamp constituted by a metal band wound on itself, of which the ends are respectively provided with complementary hooking means comprising, in particular a hook adapted to pass over a lug during the tightening operation, the inner end of the band extending, when the clamp is in closed position, at least beyond the hook. At the base of the lug supporting the hook, there is provided at least one undulation of the band, the maximum distance between the inner face of the undulation and the outer face of the extension of the inner end of the band being at the most equal to the thickness of the band and preferably included between one third and one half of this thickness.

10 Claims, 1 Drawing Sheet

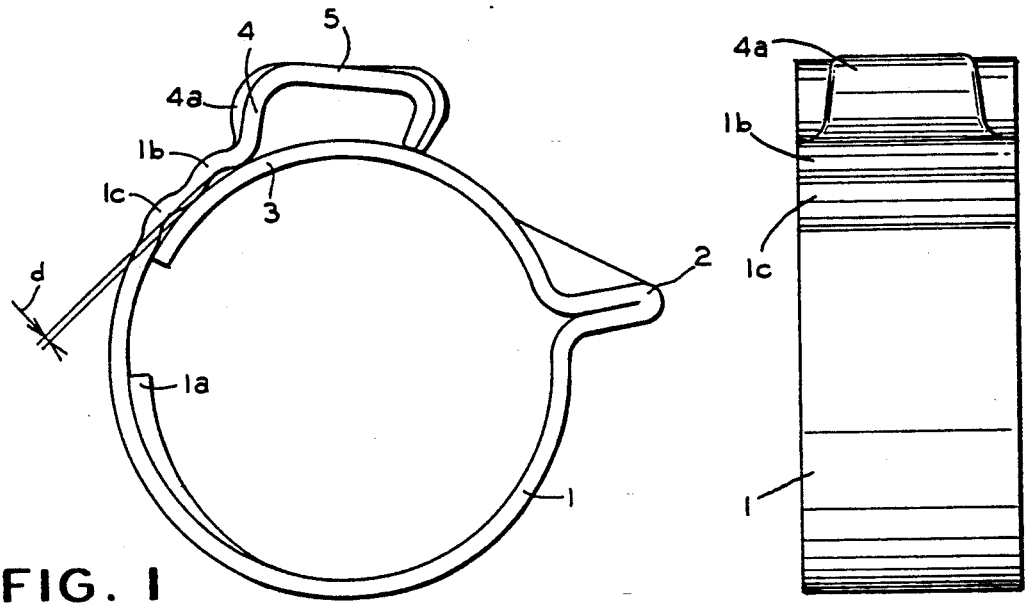
FIG. 1
FIG. 2
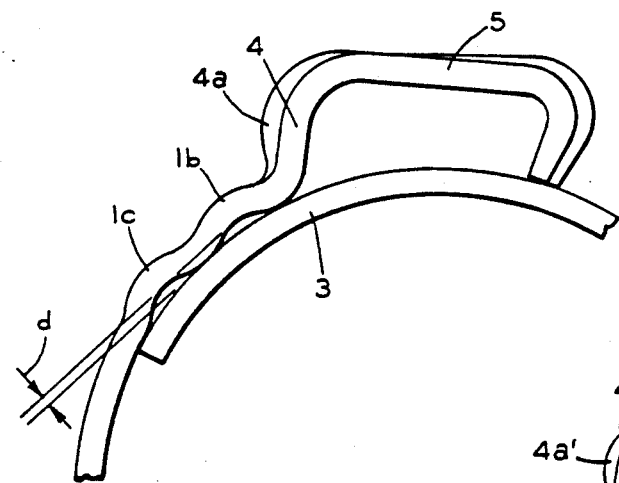
FIG. 3
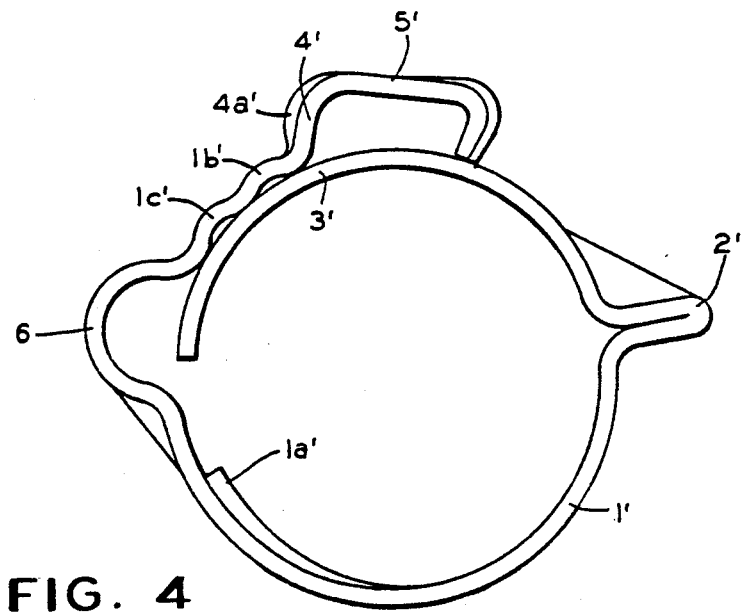
FIG. 4

BAND CLAMP

This application is a continuation-in-part of application Ser. No. 07/695,280, filed May 3, 1991.

FIELD OF THE INVENTION

The present invention relates to a clamp.

BACKGROUND OF THE INVENTION

European Patent EP-A-3 192 discloses a clamp constituted by a band of metal wound on itself, of which the two ends are respectively provided with a radial fold, forming a bearing point for a tool, of the pliers type, to tighten the clamp.

The radial fold of one of the ends of the band, preferably of the outer end, is provided with a hook adapted to pass over the radial fold of the other end, when the clamp is being tightened, with a view to being fastened thereto and thus maintaining the clamp in its tightened position. On the other hand, the inner end of the band, of which the radial fold is preferably hookless, extends beyond said fold at least beyond the hook in the closed position of the clamp.

Such a clamp is widely used in industry, especially in automobile constructions, in particular for ensuring fixation of a flexible hose fitted on a rigid tube.

However, it has been observed that, in the case of small-diameter clamps, difficulties arise either at assembly or at dismantling of the clamp, due to the insufficient flexibility of the hook with which one of the radial folds, generally the one on the outer end of the band, is provided.

It is an object of the invention to improve the clamps of the type which has just been summarily recalled, and in particular to increase the flexibility of the hook in order to facilitate assembly and dismantling of the clamp.

SUMMARY OF THE INVENTION

According to the invention, there is provided, at the base of the radial fold equipped with the hook, at least one undulation of the band, the maximum distance between the inner face of the undulation and the outer face of the extension of the inner end of the band being at the most equal to the thickness of the band and, preferably, included between one third and one half of this thickness.

BRIEF DESCRIPTION OF THE DRAWINGS

The invention will be more readily understood on reading the following description with reference to the accompanying drawings in which:

FIG. 1 is a view in elevation of a clamp according to the invention;

FIG. 2 is a view in elevation of the left side of the clamp shown in FIG. 1;

FIG. 3 is an enlarged view of a portion of the clamp shown in FIG. 1; and

FIG. 4 is a view in elevation of an alternate embodiment of a clamp according to the invention.

DETAILED DESCRIPTION OF THE PREFERRED EMBODIMENTS

Referring now to the drawings, FIG. 1 shows a clamp of the type described in the European Patent mentioned hereinbefore. The metal band 1, wound on itself, comprises, in the vicinity of its inner end, a lug 2 constituted by a radial fold, which is joined to an extension 3 located beneath the outer end. The latter likewise comprises a lug 4 constituted by a radial fold generally reinforced by a rib 4a and provided with a hook 5.

When the clamp is open, as shown in FIG. 1, hook 5 is located at some distance from lug 2, but extension 3 already extends beyond lug 4. As is shown, the terminal edge of the extension 3 preferably presents the form of a fork adapted to cooperate with a boss 1a projecting radially from the inner face of the band, as described in Patent EP-A-243 224.

As illustrated in FIGS. 1 and 2, at the base of the radial fold constituted by lug 4, the band 1 presents two small undulations 1b and 1c, but it will be noted that there may be only one such undulation. As best seen in FIG. 3, the maximum distance d between the inner face of undulation 1b and the outer face of extension 3 is small, i.e. less than the thickness of the band 1 and preferably included between one third and one half this thickness. The thickness of the band is generally about 0.4 to 0.8 mm, and preferably about 0.6 mm. The same will generally apply to undulation 1c.

When the clamp is tightened, the tool bears on lugs 2 and 4 to cause hook 5 of the latter to pass over the former. In the example shown, extension 3 extends beyond lug 4 when the clamp is in open position. This is not necessarily the case, but it is essential, as is known, that, when the clamp is in closed position, this extension extend beneath hook 5 at least as far as lug 4. It is even preferable that this extension extend beneath the most remote of the undulations 1b and 1c.

The clamp is formed of a suitable metal such as steel, and preferably stainless steel. In the preferred form, the clamp typically has a tensile strength of from about 885 to 1080 N/mm$^2$, with an elastic limit of from about 720 to 820 N/mm$^2$. Due to the limited height of the undulations, the base of the first lug 4, which includes the undulations 1b and 1c, remains in the elastic domain. Thus, the band area at the base of the lug 4 retains its strength, while the cantilever for the hook 5 at the end of that lug extends up to the top of the first (or possibly second) undulations 1b or 1c. The presence of the undulation 1b and 1c facilitate the tilting movement of lug 4 and its hook 5 when it passes over the lug 5 without a significant loss of metal strength in the area of the undulations, only when the height of the undulation is within the thickness of the band.

The presence of undulation 1b (and possibly of undulation 1c) facilitates the tilting movement of lug 4 and its hook 5 when it passes over the obstacle constituted by lug 2. In fact, the deformation of the base of lug 4 remains in the elastic domain and hooking on lug 2 is effected more cleanly than in the heretofore known clamps. Similarly, if it is desired to dismantle the clamp by unhooking hook 5 from lug 2, the indispensable tilting movement of lug 4 is again facilitated.

FIG. 4 illustrates an alternate embodiment of a clamp according to the present invention which includes a large undulation 6 providing a reserve of elastic capacity. Parts corresponding to like parts in FIG. 1 are designated by prime numerals. The reserve of elastic capacity afforded by the undulation 6 is designed to compensate for variations in diameter of the pipe to be clamped due to temperature or pressure variations or the like. Thus, the large undulation 6 affords a means for elastically modifying the peripheral length of the clamp to provide a uniform clamping pressure despite the variable conditions of use. As described above, the undulation 1b' (and possibly the undulation 1c') facilitates the tilting movement of lug 4' and the associated hook 5' when the assembly passes over the lug 2'.

What is claimed is:

1. A clamp comprising:
   a) a metal band wound on itself including an inner end, an outer end, a projecting lug spaced from the inner end, and a hooking lug formed at the outer end to provide a complementary fastening means, the hooking lug adapted to pass over the projecting lug during the clamping operation; and
   b) at least one undulation in said metal band, said undulation being adjacent to the hooking lug opposite the outer end and having a radial displacement less than the thickness of said metal band, whereby the hooking lug and said undulation define a cantilever such that said undulation remains in the elastic range when the cantilever is tilted about said undulation to fasten the clamp.

2. A clamp as defined in claim 1 wherein the maximum radial displacement of said undulation is between one third and one half of the thickness of said band.

3. A clamp as defined in claim 1, wherein said band is formed of stainless steel.

4. A clamp as defined in claim 3, wherein said band has a tensile strength of from 885 to 1080 N/mm$^2$ and an elastic limit of from 720 to 820 N/mm$^2$.

5. A clamp as defined in claim 1, wherein said hooking lug includes a tool side and a hook end extending radially from said metal band in spaced apart relationship.

6. A clamp as defined in claim 5, wherein said hooking lug includes a reinforcing rib on the tool side for engaging a clamping tool.

7. A clamp as defined in claim 1, wherein said metal band includes a reserve capacity undulation spaced-apart from said undulation adjacent the hooking lug, whereby said reserve capacity undulation provides a reserve of elastic capacity to modify the peripheral length of the clamp.

8. A clamp as defined in claim 7, wherein said metal band includes a gusset formed on a side of said reserve capacity undulation toward the inner end.

9. A clamp as defined in claim 1, wherein said metal band includes a gusset formed on a side of the projecting lug and extending toward the inner end.

10. A clamp comprising:
    a) a metal band wound on itself including an inner end, an outer end, a projecting lug spaced from the inner end, and a hooking lug formed at the outer end to provide a complementary fastening means, the hooking lug having a radially extending tool side with a reinforcing rib and a radially extending hook end spaced apart from the tool side and being adapted to pass over the projecting lug during the clamping operation;
    b) at least one fastening undulation in said metal band, said fastening undulation being adjacent to the hooking lug opposite the outer end and having a radial displacement less than the thickness of said metal band, whereby the hooking lug and said fastening undulation define a cantilever such that said fastening undulation remains in the elastic range when the cantilever is tilted about said fastening undulation to fasten the clamp; and
    c) a reserve capacity undulation in said metal band and spaced-apart from said fastening undulation, whereby said reserve capacity undulation provides an elastic reserve capacity to modify the peripheral length of the clamp.

* * * * *